United States Patent
Ohara et al.

(10) Patent No.: US 10,768,372 B2
(45) Date of Patent: Sep. 8, 2020

(54) RESIN OPTICAL WAVEGUIDE AND COMPOSITE OPTICAL WAVEGUIDE

(71) Applicant: AGC Inc., Chiyoda-ku (JP)

(72) Inventors: Seiki Ohara, Tokyo (JP); Shotaro Takenobu, Tokyo (JP)

(73) Assignee: AGC Inc., Chiyoda-ku (JP)

(*) Notice: Subject to any disclaimer, the term of this patent is extended or adjusted under 35 U.S.C. 154(b) by 0 days.

(21) Appl. No.: 16/292,375

(22) Filed: Mar. 5, 2019

(65) Prior Publication Data

US 2019/0204503 A1 Jul. 4, 2019

Related U.S. Application Data

(63) Continuation of application No. PCT/JP2017/031006, filed on Aug. 29, 2017.

(30) Foreign Application Priority Data

Sep. 6, 2016 (JP) .................. 2016-173839

(51) Int. Cl.
*G02B 6/30* (2006.01)
*G02B 6/122* (2006.01)
(Continued)

(52) U.S. Cl.
CPC ............ *G02B 6/30* (2013.01); *G02B 6/1221* (2013.01); *G02B 6/1228* (2013.01);
(Continued)

(58) Field of Classification Search
CPC .......................... G02B 6/1221; G02B 6/1228
See application file for complete search history.

(56) References Cited

U.S. PATENT DOCUMENTS 5,054,872 A    10/1991  Fan et al.
5,724,461 A *   3/1998  Bruno ............... G02B 6/12011
                                                            385/11
(Continued)

FOREIGN PATENT DOCUMENTS

CN    103777275 A    5/2014
JP    2001-4870      1/2001
(Continued)

OTHER PUBLICATIONS

International Search Report dated Nov. 28, 2017 in PCT/JP2017/031006 filed Aug. 29, 2017 (with English Translation).
(Continued)

*Primary Examiner* — Omar R Rojas
(74) *Attorney, Agent, or Firm* — Oblon, McClelland, Maier & Neustadt, L.L.P.

(57) ABSTRACT

The present invention relates to a resin optical waveguide including a core and a cladding having a refractive index lower than that of the core, in which the resin optical waveguide includes, along a light propagation direction, a coupling part at which at least a part of the core is exposed and an optical waveguide part where the whole circumference of the core is covered with the cladding, and the core has a width Wb at an end part of the coupling part at a side of the optical waveguide part being larger than a width Wa of the core at an end part of the coupling part at a side opposite to the optical waveguide part.

13 Claims, 8 Drawing Sheets

(51) Int. Cl.
*G02B 6/28* (2006.01)
*G02B 6/38* (2006.01)
*G02B 6/12* (2006.01)

(52) U.S. Cl.
CPC .......... *G02B 6/2821* (2013.01); *G02B 6/3885* (2013.01); *G02B 2006/12061* (2013.01)

(56) References Cited

U.S. PATENT DOCUMENTS

| | | |
|---|---|---|
| 6,516,104 B1 | 2/2003 | Furuyama |
| 8,534,927 B1 | 9/2013 | Barwicz et al. |
| 8,545,108 B1 | 10/2013 | Barwicz et al. |
| 8,724,937 B2 | 5/2014 | Barwicz et al. |
| 9,008,477 B2 | 4/2015 | Numata |
| 2003/0113054 A1 | 6/2003 | Furuyama |
| 2010/0040327 A1 | 2/2010 | Deki et al. |
| 2012/0039576 A1 | 2/2012 | Dangel et al. |
| 2012/0155821 A1 | 6/2012 | Dangel et al. |
| 2013/0251304 A1 | 9/2013 | Barwicz et al. |
| 2014/0035175 A1 | 2/2014 | Numata et al. |
| 2014/0037777 A1 | 2/2014 | Numata et al. |
| 2014/0061979 A1 | 3/2014 | Numata et al. |
| 2014/0112616 A1 | 4/2014 | Numata |
| 2014/0112629 A1 | 4/2014 | Numata et al. |
| 2015/0202802 A1 | 7/2015 | Numata et al. |
| 2015/0266248 A1 | 9/2015 | Numata et al. |
| 2015/0273732 A1 | 10/2015 | Numata et al. |
| 2016/0054520 A1 | 2/2016 | Meade et al. |
| 2016/0091675 A1 | 3/2016 | Barwicz et al. |
| 2016/0103279 A1 | 4/2016 | Budd |
| 2016/0252686 A1 | 9/2016 | Numata et al. |
| 2017/0059780 A1 | 3/2017 | Budd |
| 2017/0097474 A1 | 4/2017 | Barwicz et al. |
| 2018/0039029 A1 | 2/2018 | Barwicz et al. |

FOREIGN PATENT DOCUMENTS

| | | |
|---|---|---|
| JP | 2014-29386 | 2/2014 |
| JP | 2014-52405 | 3/2014 |
| JP | 2014-81586 | 5/2014 |
| JP | 2014-81587 | 5/2014 |
| JP | 2016-71137 | 5/2016 |
| WO | WO 2008/114624 A1 | 9/2008 |
| WO | WO 2009/098829 A1 | 8/2009 |

OTHER PUBLICATIONS

Written Opinion dated Nov. 28, 2017 in PCT/JP2017/031006 filed Aug. 29, 2017.

* cited by examiner

RESIN OPTICAL WAVEGUIDE AND COMPOSITE OPTICAL WAVEGUIDE

CROSS-REFERENCE TO RELATED APPLICATIONS

This application is a Continuation of PCT/JP2017/031006, which was filed on Aug. 29, 2017. This application is based upon and claims the benefit of priority to Japanese Application No. 2016-173839, which was filed on Sep. 6, 2016, the entire contents of which are incorporated herein by reference.

TECHNICAL FIELD

The present invention relates to a resin optical waveguide and a composite optical waveguide.

BACKGROUND ART

Attention has been paid to silicon photonics that is a technique of integrating silicon optical circuits on a silicon chip. In the silicon photonics, there are known a resin optical waveguide utilizing an adiabatic-coupling as a waveguide for transmitting optical signals between a silicon optical waveguide formed in an optical integrated circuit and an optical fiber (e.g., refer to Patent Document 1). In the case where such a resin optical waveguide is used, propagation loss between the silicon optical waveguide and the optical fiber can be reduced.

PRIOR ART DOCUMENT

Patent Document

Patent Document 1: JP-A 2014-81586

SUMMARY OF THE INVENTION

Problems that the Invention is to Solve

However, in the case where the resin optical waveguide of Patent Document 1 is used, the reduction degree of propagation loss between a silicon optical waveguide and an optical fiber is not sufficient. It is required to connect a silicon optical waveguide and an optical fiber with further low loss.

Accordingly, an embodiment of the present invention aims to provide a resin optical waveguide capable of reducing the propagation loss between a silicon optical waveguide and an optical fiber.

Means for Solving the Problems

In order to achieve the object, the resin optical waveguide according to an embodiment of the present invention is a resin optical waveguide including a core and a cladding having a refractive index lower than that of the core, in which the resin optical waveguide includes, along a light propagation direction, a coupling part at which at least a part of the core is exposed and an optical waveguide part where the whole circumference of the core is covered with the cladding, and the core has a width Wb at an end part of the coupling part at a side of the optical waveguide part being larger than a width Wa of the core at an end part of the coupling part at a side opposite to the optical waveguide part.

Advantage of the Invention

According to the disclosed resin optical waveguide, propagation loss between a silicon optical waveguide and an optical fiber can be reduced.

BRIEF DESCRIPTION OF THE DRAWINGS

(a) of FIG. 7 and (b) of FIG. 7 are figures for illustrating the core of a resin optical waveguide according to an embodiment of the present invention.

MODES FOR CARRYING OUT THE INVENTION

Hereinafter, modes for carrying out of the present invention will be described with reference to drawings. In the present description and drawings, the same reference numerals and signs are attached to substantially the same configurations and repeated descriptions thereof are omitted.

(Composite Optical Waveguide)

Figure 1:
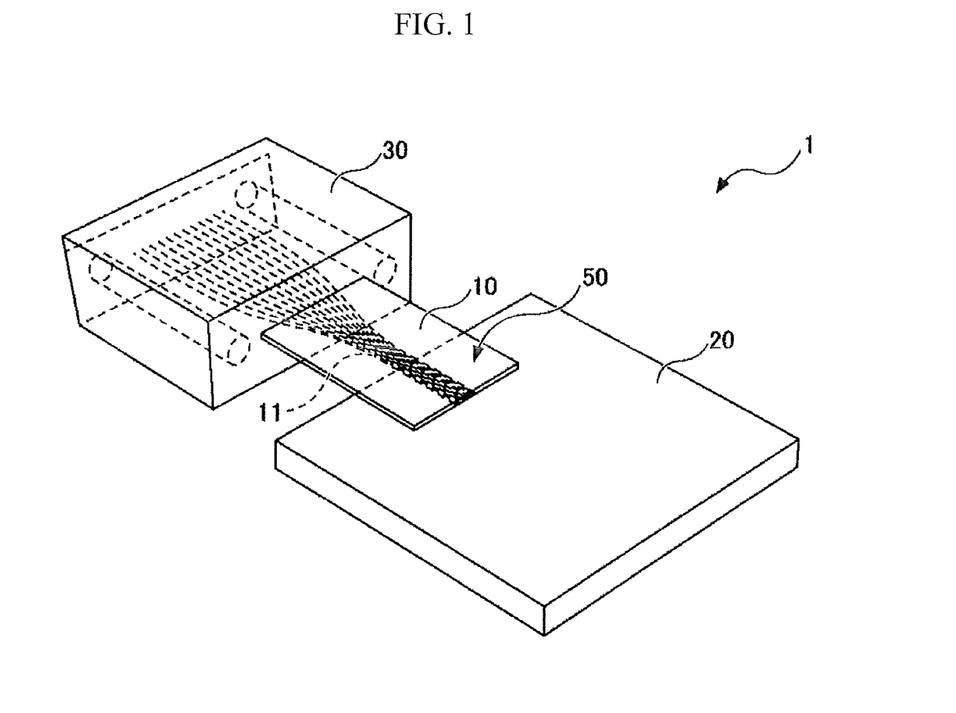
FIG. 1 is a schematic perspective view of a composite optical waveguide according to an embodiment of the present invention.
Figure 2:
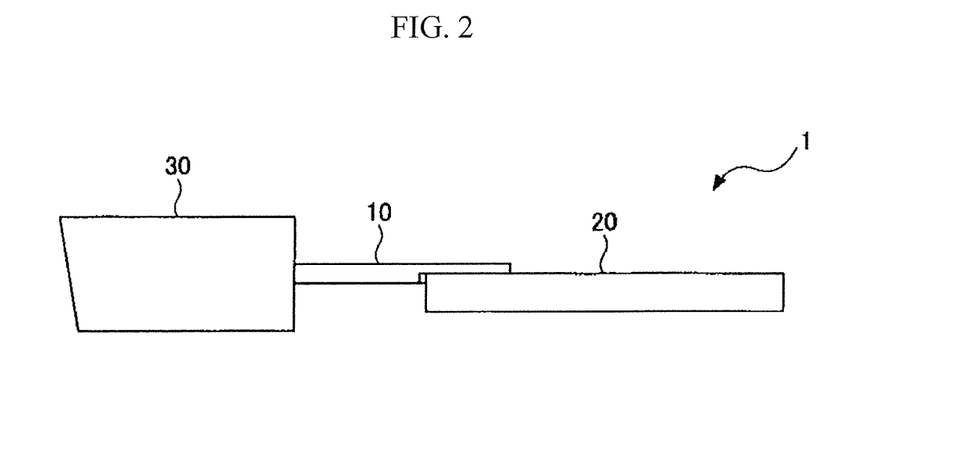
FIG. 2 is a schematic side view of the composite optical waveguide of FIG. 1.
Figure 3:
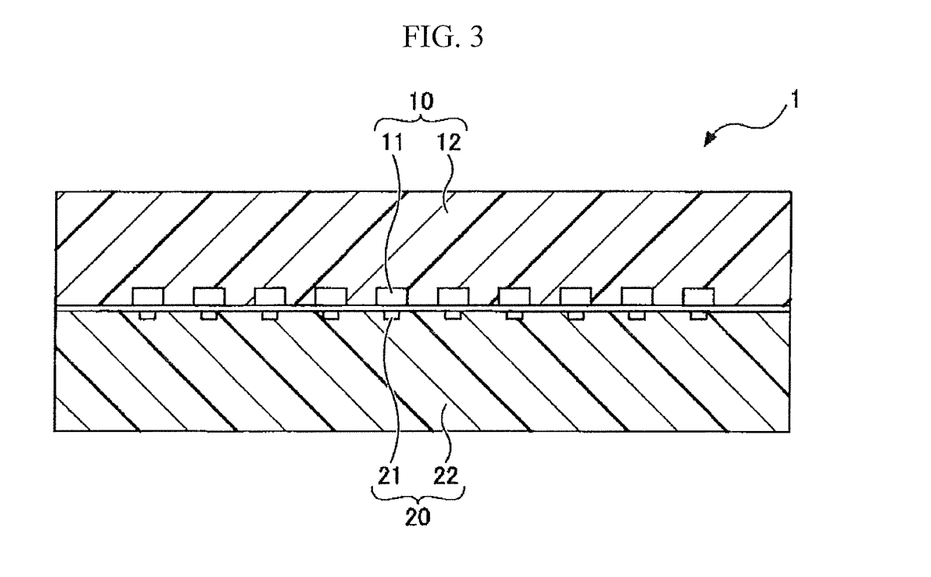
FIG. 3 is a schematic vertical cross-sectional view of an adiabatic-coupling portion of the composite optical waveguide of FIG. 1.
Figure 4:
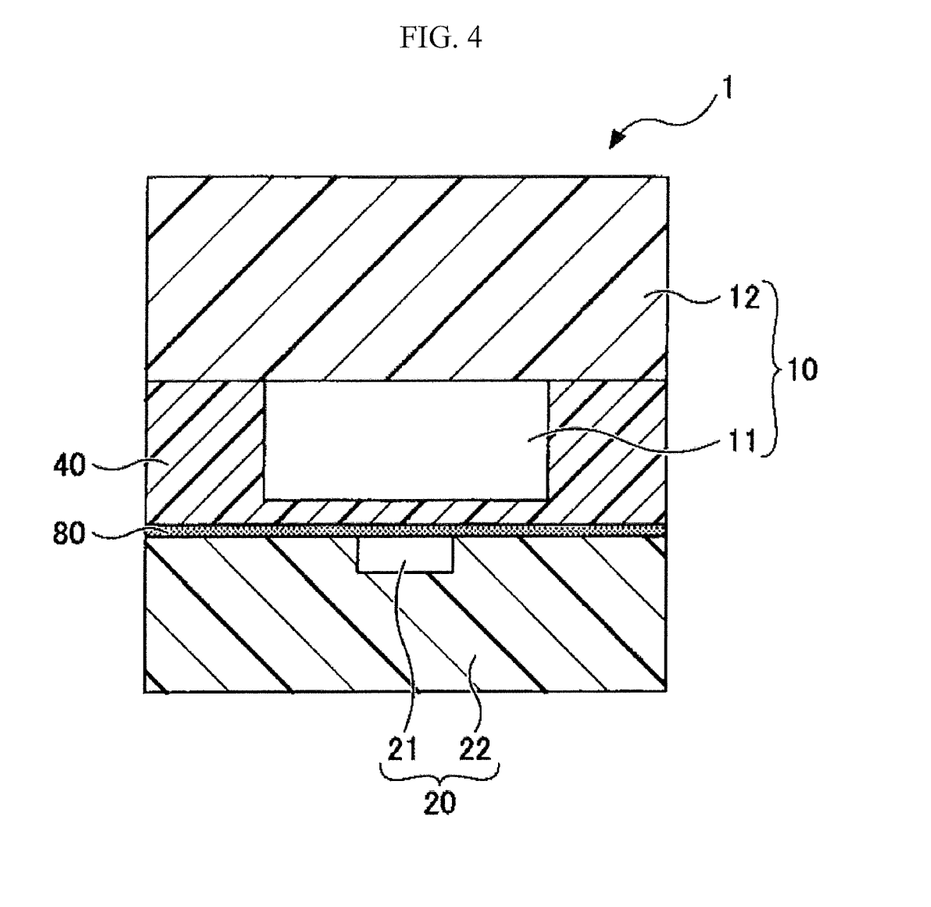
FIG. 4 is a partial enlarged view of FIG. 3.
Figure 5:
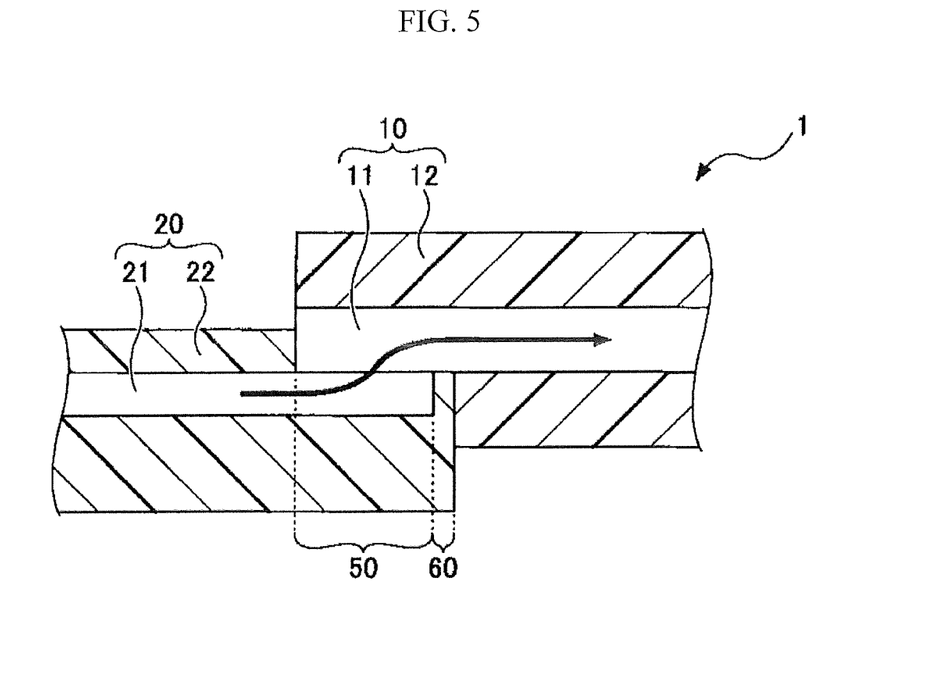
FIG. 5 is a schematic longitudinal cross-sectional view of the adiabatic-coupling portion of the composite optical waveguide of FIG. 1.

A composite optical waveguide containing a resin optical waveguide according to an embodiment of the present invention will be described with reference to FIG. 1 to FIG. 5. FIG. 1 is a schematic perspective view of a composite optical waveguide according to an embodiment of the present invention. FIG. 2 is a schematic side view of the composite optical waveguide of FIG. 1. FIG. 3 is a schematic vertical cross-sectional view of an adiabatic-coupling portion of the composite optical waveguide of FIG. 1. FIG. 4 is a partial enlarged view of FIG. 3. FIG. 5 is a schematic longitudinal cross-sectional view of the adiabatic-coupling portion of the composite optical waveguide of FIG. 1. Incidentally, the arrow in FIG. 5 indicates a light propagation direction. Moreover, in FIG. 1, FIG. 2, FIG. 3, and FIG. 5, a part of illustrations, for example, an adhesive 40 to be mentioned later, are omitted.

The composite optical waveguide according to an embodiment of the present invention includes a resin optical waveguide according to an embodiment of the present invention and a connector housing an optical waveguide part of the resin optical waveguide. As a more specific embodiment, as illustrated in FIG. 1 and FIG. 2, the composite optical waveguide 1 has a resin optical waveguide 10, a silicon optical waveguide 20 and a connector 30.

The resin optical waveguide 10 forms a portion to be adiabatically coupled (hereinafter referred to as "adiabatic-coupling portion 50") with the silicon optical waveguide 20 at one end side. Moreover, the resin optical waveguide 10 forms a portion to be connected to a single-mode optical fiber or the like at the other end side, the portion being housed in the connector 30 for connection to the single-mode optical fiber or the like.

Thus, the resin optical waveguide 10 is used in a silicon photonics interface that connects the silicon optical waveguide 20 and the resin optical waveguide 10 with low loss and at low cost. Therefore, the resin optical waveguide 10 is preferably a single-mode optical waveguide from the viewpoint that optical signals propagating through the single-mode optical waveguide can be highly densified. In this case, from the viewpoint that light can be propagated with low loss even to the silicon optical waveguide and the single-mode optical fiber, it is preferably a single-mode optical waveguide at at least one wavelength of 1,310 nm and 1,550 nm.

As illustrated in FIG. 3, the resin optical waveguide 10 has a plurality of cores 11 and a cladding 12. The cores 11 are formed such that the shape of a face perpendicular to the light propagation direction is, for example, rectangular. The cladding 12 is formed of a material having a refractive index lower than that of the cores 11. Thereby, in the resin optical waveguide 10, light propagates through the cores 11.

As illustrated in FIG. 5, the silicon optical waveguide 20 forms a portion to be adiabatically coupled with the end side of the resin optical waveguide 10 at one end side.

As illustrated in FIG. 3 to FIG. 5, the silicon optical waveguide 20 has cores 21 and a cladding 22. The cores 21 are formed such that the shape of a face perpendicular to the light propagation direction is, for example, rectangular. The cladding 22 is formed of a material having a refractive index lower than that of the cores 21. Thereby, in the silicon optical waveguide 20, light propagates through the cores 21.

In the adiabatic-coupling, evanescent light is captured and propagated over a predetermined distance in the light propagation direction. For this reason, as illustrated in FIG. 5, in the adiabatic-coupling portion 50, the core 11 of the resin optical waveguide 10 and the core 21 of the silicon optical waveguide 20 are disposed to face each other and also the cladding 12 and the cladding 22 are not provided between the core 11 and the core 21. Namely, in the adiabatic-coupling portion 50, a side facing to the core 21 in the core 11 and a side facing to the core 11 in the core 21, which are parts of the core 11 and the core 21, are exposed. Moreover, as illustrated in FIG. 4, in the adiabatic-coupling portion 50, the core 11 and the core 21 are disposed in a state of facing each other and bonded by using an adhesive 40 of an epoxy resin or the like.

On a surface at the side of the adhesive 40 of the silicon optical waveguide 20, for suppressing diffusion of ions of an alkali metal such as sodium (Na), a barrier layer 80 may be formed. The barrier layer 80 has a thickness of, for example, 0.01 μm or more and 0.5 μm or less. As a material for constituting the barrier layer 80, for example, silicon nitride ($Si_3N_4$) can be used.

In the composite optical waveguide 1 having such adiabatically coupled resin optical waveguide resin optical waveguide 10 and silicon optical waveguide 20, light propagates from the core 21 of the silicon optical waveguide 20 to the core 11 of the resin optical waveguide 10 through the adiabatic-coupling portion 50. Alternatively, light propagates from the core 11 of the resin optical waveguide 10 to the core 21 of the silicon optical waveguide 20.

(Resin Optical Waveguide)

The resin optical waveguide according to the present embodiment has a core and a cladding having a refractive index lower than that of the core as mentioned above, and includes a coupling part at which at least a part of the core is exposed and an optical waveguide part where the whole circumference of the core is covered with the cladding, along a light propagation direction. The core of the coupling part has the width Wb at the end part at the optical waveguide part side being larger than the width Wa at the end part at the side opposite to the optical waveguide part.

In the present description, in the case where the core in the resin optical waveguide has a shape of a face (cross-section) perpendicular to the light propagation direction being rectangular, the "width" of the core means the major axis length of the rectangle.

Of the width of the core of the coupling part, the width Wa at the end part at the side opposite to the optical waveguide part is preferably 4 μm or more, more preferably 5 μm or more, and further preferably 6 μm or more, from the viewpoint that propagation loss can be reduced. Moreover, the width Wb at the end part at the optical waveguide part side is preferably 10 μm or less and more preferably 9 μm or less, from the viewpoint of actualizing stable single-mode propagation.

The ratio (Wb/Wa) of the width Wa of the core and the width Wb of the core is preferably 1.1 or more, more preferably 1.2 or more, further preferably 1.3 or more, and still further preferably 1.4 or more, from the viewpoint of reducing propagation loss.

Figure 6:
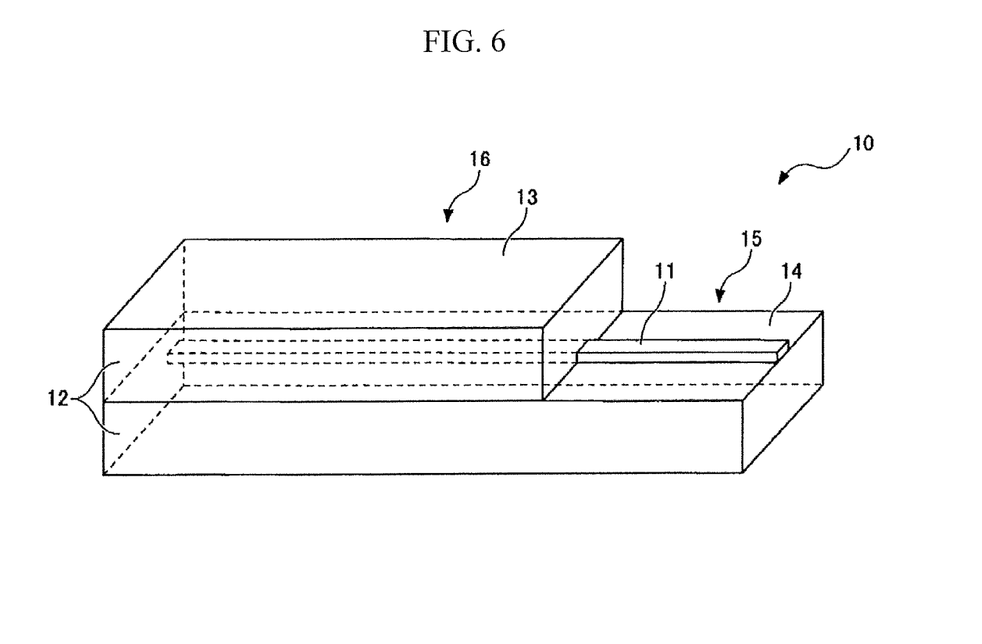
FIG. 6 is a schematic perspective view of a resin optical waveguide according to an embodiment of the present invention.

Details of the resin optical waveguide 10 according to an embodiment of the present invention will be described with reference to FIG. 6. FIG. 6 is a schematic perspective view of a resin optical waveguide according to an embodiment of the present invention. Incidentally, for convenience of explanation, the resin optical waveguide 10 in FIG. 1 is turned upside down and only one core 11 is illustrated.

As illustrated in FIG. 6, the resin optical waveguide 10 has a core 11 and a cladding 12. The cladding 12 has an overcladding 13 and an undercladding 14.

The core 11 is formed of a material having a refractive index higher than that of the cladding 12. The core 11 may have refractive index distribution inside. In this case, it may have refractive index distribution of decreasing the refractive index in a direction away from the center of the core 11. Moreover, the core 11 may have refractive index distribution that the refractive index at the overcladding 13 side is high and the refractive index at the undercladding 14 side becomes low, or may have refractive index distribution that the refractive index at the overcladding 13 side is low and the refractive index at the undercladding 14 side becomes high. Furthermore, in the adiabatic-coupling portion 50, unless the height of the core 11 is made small to some extent, the spread of the propagation mode does not increase and thus light cannot be propagated between the silicon optical waveguide 20 and the resin optical waveguide 10. For this reason, the height of the core 11 in the adiabatic-coupling portion 50 is preferably 5 μm or less, more preferably 1 μm or more and 4 μm or less, and particularly preferably 1.5 μm or more and 3 μm or less. In the present description, in the case where the core in the resin optical waveguide has a shape of a face perpendicular to the light propagation direction being rectangular, the "height" of the core means the minor axis length of the rectangle.

The overcladding 13 is formed above the core 11. The overcladding 13 is formed such that the length thereof in the light propagation direction is shorter than the length of the core 11 in the light propagation direction. Thereby, a coupling part 15 that is a portion at which an upper part of the core 11 is exposed and an optical waveguide part 16 that is a portion where the core 11 is covered with the overcladding 13 and the undercladding 14 are formed along the light propagation direction of the core 11. At the time when the resin optical waveguide 10 and the silicon optical waveguide 20 are adiabatically coupled with each other, the coupling part 15 becomes the adiabatic-coupling portion 50. The coupling part 15 is formed by, for example, a patterning using a photolithography process after the overcladding 13 is formed on or above the core 11 over the whole length of the resin optical waveguide 10.

The coupling part 15 is a portion where the overcladding 13 is not formed over the core 11 and an upper part of the core 11 is exposed. Since the coupling part 15 serves a connection portion of the resin optical waveguide 10 with the silicon optical waveguide 20, it is required to have sufficient length for the use as a connection portion with the silicon optical waveguide 20. Specifically, the length of the coupling part 15 in the light propagation direction of the resin optical waveguide 10 is preferably 100 μm or more, more preferably 300 μm or more, further preferably 500 μm or more, and particularly preferably 1,000 μm or more. However, in the case where the length of the coupling part 15 in the light propagation direction of the resin optical waveguide 10 is too long, when it is coupled with the silicon optical waveguide 20 by using the adhesive 40, light absorption by the adhesive 40 becomes large and thus propagation loss becomes high in some cases. For this reason, the length of the coupling part 15 in the light propagation direction of the resin optical waveguide 10 is preferably 10,000 μm or less, more preferably 5,000 μm or less, and particularly preferably 3,000 μm or less.

The overcladding 13 is formed of a material having a refractive index lower than that of the core 11. The overcladding 13 may have single refractive index or may have a portion where the refractive index is different between a near side and a far side relative to the core 11. In this case, it may have a configuration that the refractive index decreases toward the far side relative to the core 11 or may have a configuration that the refractive index increases toward the far side relative to the core 11. The thickness of the overcladding 13 is not particularly limited but, in the case where the resin optical waveguide 10 is a single-mode optical waveguide, the thickness is preferably 10 μm or more. Thereby, there can be suppressed the leakage of light to the cladding 12 existing within about 10 μm from the center of the core 11 and a resulting increase of the propagation loss of light.

The undercladding 14 is formed under the core 11. The undercladding 14 is formed such that the length thereof in the light propagation direction becomes about the same as the length of the core 11 in the light propagation direction. The undercladding 14 is formed of a material having a refractive index lower than that of the core 11. The undercladding 14 may be formed of the same material as or formed of a different material from that of the overcladding 13. The undercladding 14 may have single refractive index or may have a portion where the refractive index is different between a near side and a far side relative to the core 11. In this case, it may have a configuration that the refractive index decreases toward the far side relative to the core 11 or may have a configuration that the refractive index increases toward the far side relative to the core 11. The thickness of the undercladding 14 is not particularly limited but, in the case where the resin optical waveguide 10 is a single-mode optical waveguide, the thickness is preferably 10 μm or more form the viewpoint that propagation loss of light can be reduced. Thereby, there can be suppressed the leakage of light to the cladding 12 existing within about 10 μm from the center of the core 11 and a resulting increase of the propagation loss of light.

The materials that compose the core 11 and the cladding 12 are not particularly limited as long as they are materials which generate such a difference in the refractive index that the refractive index of the cladding 12 becomes lower than the refractive index of the core 11. For example, use can be made of a variety of resin materials such as acrylic resins, methacrylic resins, epoxy resins, oxetane resins, phenoxy resins, benzocyclobutene resins, norbornene resins, fluororesins, silicone resins, polycarbonates, polystyrene, polyamides, polyimides, polybenzoxazoles, polysilanes, and polysilazanes, and organic and inorganic hybrid materials. Of these materials, since fluororesins have a low water absorption rate or moisture absorption rate, excellent durability against high temperature and high humidity, and exhibit high chemical stability, they are suitable as materials of the core 11 and the cladding 12. The resin optical waveguide 10 using the fluororesin(s) as the core 11 and/or the cladding 12 undergoes small variation in the refractive index, which may be caused by a change in an external environment, particularly by a change in humidity, thus has stable characteristics, and exhibits high transparency in a wavelength band for optical communication.

Figure 7:
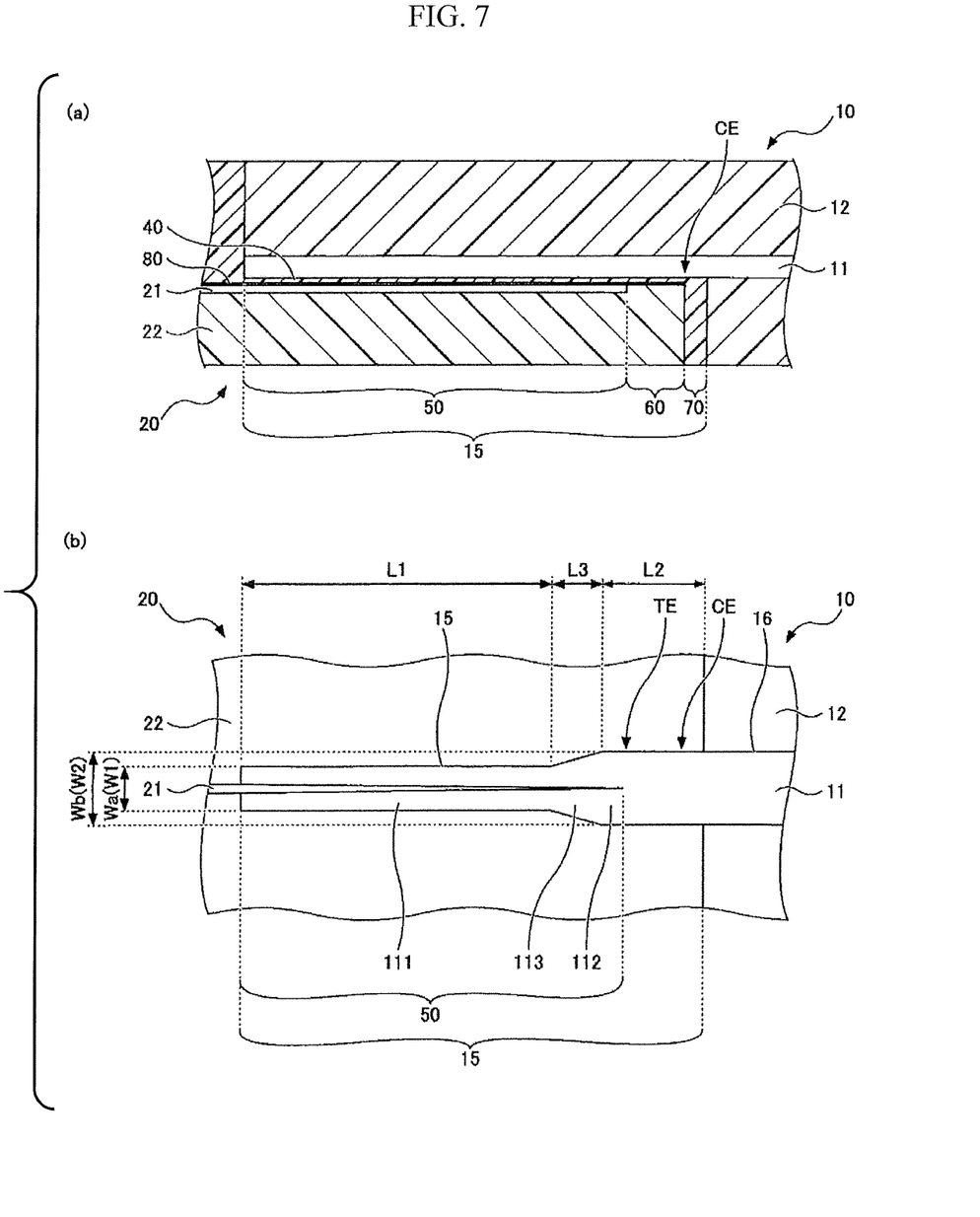

Next, the core 11 of the resin optical waveguide 10 will be described with reference to (a) and (b) of FIG. 7. (a) and (b) of FIG. 7 are figures for illustrating the core of a resin optical waveguide according to an embodiment of the present invention, (a) of FIG. 7 illustrates a cross-section including an adiabatic-coupling portion, and (b) of FIG. 7 illustrates an upper face including an adiabatic-coupling portion. Incidentally, for convenience of illustration, only one core is illustrated in (a) and (b) of FIG. 7.

As illustrated in (a) of FIG. 7, the resin optical waveguide 10 is disposed in a state that the core 11 and the core 21 face each other and are bonded by using the adhesive 40 in the adiabatic-coupling portion 50.

Moreover, as illustrated in (b) of FIG. 7, the core 11 of the resin optical waveguide 10 is formed such that the width Wb at the end part at the side of the optical waveguide part 16 in the coupling part 15 is larger than the width Wa at the end part at the side opposite to the optical waveguide part 16 in the coupling part 15. Thereby, the propagation loss of light propagating from the silicon optical waveguide 20 to the resin optical waveguide 10 can be reduced. This is because it is considered that the propagation loss at the time when light is propagated from the silicon optical waveguide 20 to the resin optical waveguide 10 becomes low in the case where the width of the core 11 becomes small in the adiabatic-coupling portion 50 but the propagation loss becomes low in the case where the width of the core 11 becomes large at the end part TE of the core 21 of the silicon optical waveguide 20 and at the substrate end CE of the silicon optical waveguide 20.

More specifically, the core 11 of the resin optical waveguide 10 preferably contains a first core part 111, a third core part 113, and a second core part 112 in this order along the light propagation direction.

The first core part 111 includes the end part opposite to the optical waveguide part 16 of the coupling part 15 and has a first length L1 and a first width W1. The second core part 112 includes the end part at the side of the optical waveguide part 16 of the coupling part 15 and has a second length L2 and a second width W2 that is wider than the first width W1. The third core part 113 is provided between the first core part 111 and the second core part 112 and has a third length L3 through which the width changes from the first width W1 to the second width W2.

Moreover, the value calculated from L3/(L1+L2+L3) using the first length L1, the second length L2 and the third length L3 is preferably 0.01 or more, in order to prevent exfoliation of the core 11 of the resin optical waveguide 10. Furthermore, the value calculated from L3/(L1+L2+L3) is preferably 0.95 or less. Thereby, at the time when light is propagated from the silicon optical waveguide 20 to the resin optical waveguide 10, the propagation loss at the adiabatic-coupling portion 50 can be reduced and also the propagation loss at the end part TE of the core 21 of the silicon optical waveguide 20 and at the substrate end CE can be reduced. The value calculated from L3/(L1+L2+L3) is more preferably 0.05 or more and 0.9 or less and further preferably 0.1 or more and 0.8 or less.

Figure 8:
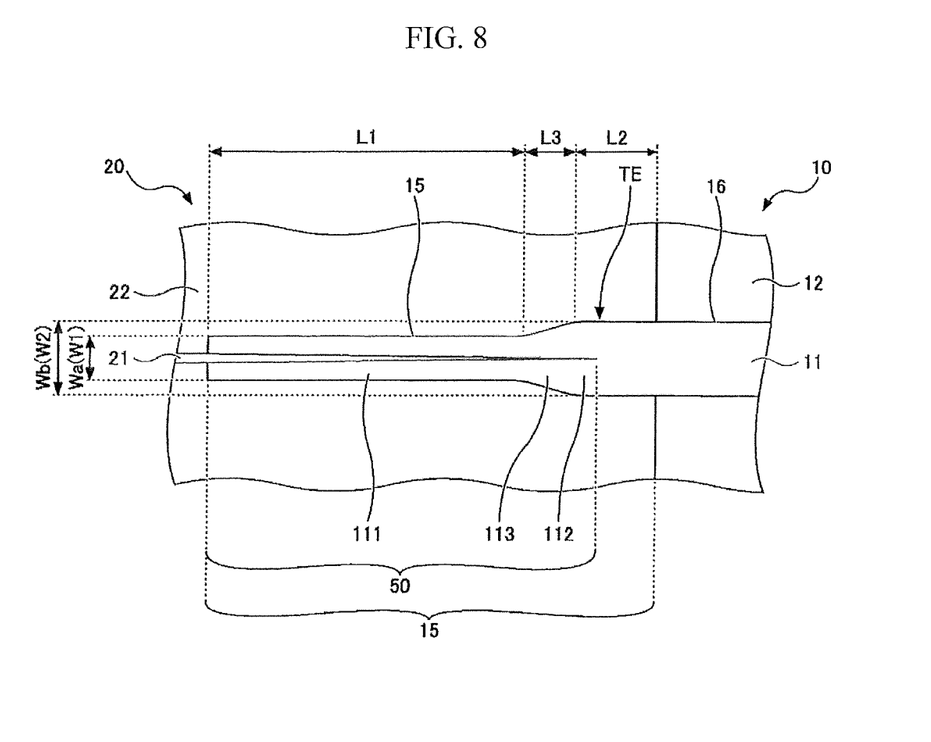
FIG. 8 is a figure for illustrating the core of a resin optical waveguide according to an embodiment of the present invention.

Next, another example of the core 11 of the resin optical waveguide 10 will be described with reference to FIG. 8. FIG. 8 is a figure for illustrating the core of a resin optical waveguide according to an embodiment of the present invention and illustrates an upper face including an adiabatic-coupling portion. Incidentally, for convenience of illustration, only one core is illustrated in FIG. 8.

In the core 11 illustrated in FIG. 8, a corner part of the boundary portion between the first core part 111 and the third core part 113 and a corner part of the boundary portion between the second core part 112 and the third core part 113 of the core 11 illustrated in FIG. 7 are chamfered. Thereby, exfoliation of the core 11 can be particularly suppressed. Thus, in an embodiment, at least either one of the corner part of the boundary portion between the first core part and the third core part and the boundary portion between the second core part and the third core part of the resin optical waveguide is chamfered.

Figure 9:
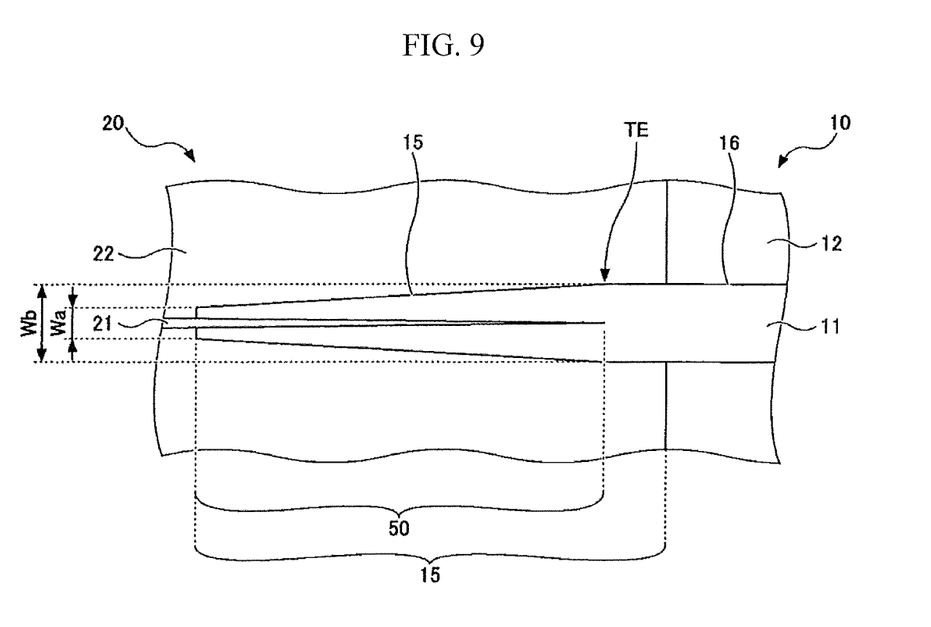
FIG. 9 is a figure for illustrating the core of a resin optical waveguide according to an embodiment of the present invention.

Next, still another example of the core 11 of the resin optical waveguide 10 will be described with reference to FIG. 9. FIG. 9 is a figure for illustrating the core of a resin optical waveguide according to an embodiment of the present invention and illustrates an upper face including an adiabatic-coupling portion. Incidentally, for convenience of illustration, only one core is illustrated in FIG. 9.

As illustrated in FIG. 9, the core 11 of the resin optical waveguide 10 is formed such that the width Wb at the end part at the side of the optical waveguide part 16 of the coupling part 15 is larger than the width Wa at the end part at the side opposite to the optical waveguide part 16 of the coupling part 15. More specifically, the core 11 of the resin optical waveguide 10 is formed in such a tapered shape that the width of the core 11 is narrowed from the end part at the side of the optical waveguide part 16 of the coupling part 15 toward the end part opposite to the optical waveguide part 16 of the coupling part 15. Namely, the width of the core in the coupling part is monotonously decreased from the end part at the optical waveguide part side of the coupling part toward the end part at the side opposite to the optical waveguide part of the coupling part. To be monotonously decreased may be to be linearly decreased or to be curvedly decreased, and FIG. 9 is an example where the width is linearly decreased. Thereby, as in the case illustrated in FIG. 7, the propagation loss of light propagating from the silicon optical waveguide 20 to the resin optical waveguide 10 can be reduced.

Figure 10:
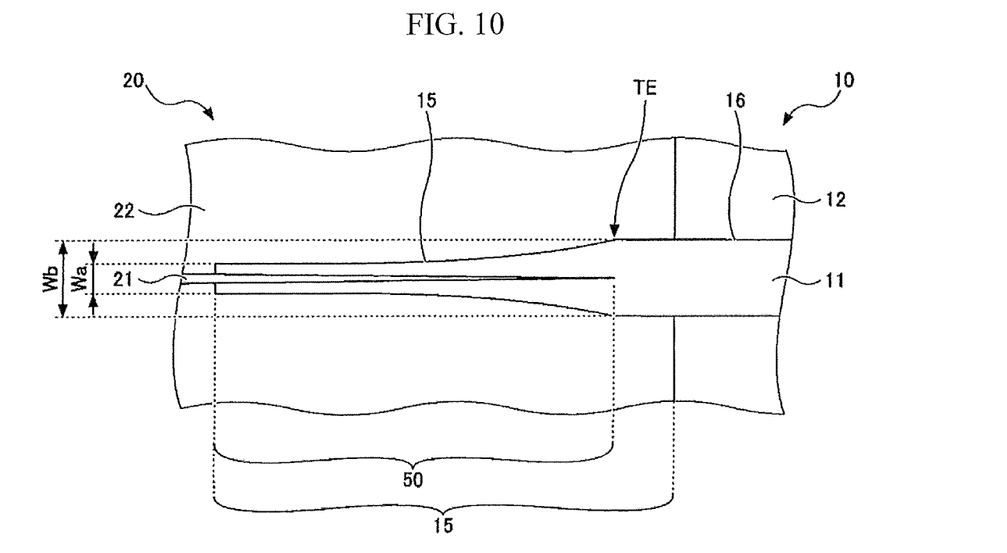
FIG. 10 is a figure for illustrating the core of a resin optical waveguide according to an embodiment of the present invention.

Next, still another example of the core 11 of the resin optical waveguide 10 will be described with reference to FIG. 10. FIG. 10 is a figure for illustrating the core of a resin optical waveguide according to an embodiment of the present invention and illustrates an upper face including an adiabatic-coupling portion. Incidentally, for convenience of illustration, only one core is illustrated in FIG. 10.

As illustrated in FIG. 10, the core 11 of the resin optical waveguide 10 is formed such that the width Wb at the end part at the side of the optical waveguide part 16 of the coupling part 15 is larger than the width Wa at the end part at the side opposite to the optical waveguide part 16 of the coupling part 15. More specifically, the core 11 of the resin optical waveguide 10 is formed in such an arc shape that the width of the core 11 is narrowed from the end part of the adiabatic-coupling portion 50 at the side of the optical waveguide part 16 of the coupling part 15 toward the end part opposite to the optical waveguide part 16 of the coupling part 15. Namely, the width of the core in the coupling part is curvedly decreased from the end part at the optical waveguide part side of the coupling part toward the end part at the side opposite to the optical waveguide part of the coupling part. In FIG. 10, the width of the core is narrowed in a protruded arc shape but the width of the core may be narrowed in a recessed arc shape. Thereby, as in the case illustrated in FIG. 7, the propagation loss of light propagating from the silicon optical waveguide 20 to the resin optical waveguide 10 can be reduced.

(Method for Producing Resin Optical Waveguide)

There will be described an example of a method for producing the resin optical waveguide 10 according to an embodiment of the present invention.

First, a first curable resin composition is applied on a substrate by a spin coating method. Subsequently, the first curable resin composition is cured to form an undercladding 14.

Next, a second curable resin composition is applied on the undercladding 14 by a spin coating method. Subsequently, the second curable resin composition is patterned by a photolithography process to form a core 11 on the undercladding 14. At this time, in the case of forming a shape in which the width of the core 11 is different along the light propagation direction, the core 11 can be formed by performing exposure by using a photomask having a shape in which the width of the core 11 is different along the light propagation direction and subsequently performing development. Moreover, after the core 11 is formed, if necessary, post-baking may be performed.

Next, a third curable resin composition is applied on the undercladding 14 and the core 11 by a spin coating method. Subsequently, the third curable resin composition is cured to form an overcladding 13. At the time of forming the overcladding 13, by a photolithography process, there can be formed a region (optical waveguide part 16) where the overcladding 13 is formed and a region (coupling part 15) where the overcladding 13 is not formed and the core 11 is exposed.

By the above method, the resin optical waveguide 10 can be produced. Incidentally, when the curable resin compositions are applied, it is preferable to perform the application after the curable resin compositions are sufficiently left at rest to defoam. Thereby, there can be produced a resin optical waveguide 10 where bubble defects are absent at the inside of the core and in the vicinity of the interface between the core 11 and the cladding 12. Moreover, in addition to or instead of sufficiently leaving the curable resin composition at rest to defoam, it is preferable to perform defoaming by utilizing a defoaming apparatus. Furthermore, before the application of the curable resin compositions, it is preferable to filtrate the curable resin compositions. Thereby, foreign matter in the curable resin compositions can be removed. In addition, before the application of the curable resin compositions, it is preferable to perform washing of the substrate. Thereby, foreign matter on the surface of the substrate can be removed. Moreover, in order to prevent attachment of foreign matter in the air, it is preferable to perform these works in a clean room and, in order to prevent attachment of foreign matter by static electricity, it is further preferable to use a static electricity eliminator (ionizer).

EXAMPLES

Hereinafter, the present invention will be described in more detail by Examples, but the present invention is not limited to these Examples.

In Examples shown below, by using an optical fiber/waveguide design/analyzing software, Beam PROP (manufactured by RSoft Design Group, Inc.), by a bidirectional BPM method, which is a simulation engine, simulation of light propagation in a TE mode was performed by a finite difference beam propagation method, in the structure illustrated in FIG. 7.

In the simulation, by using Rsoft CAD (manufactured by Rsoft Design Group, Inc.), structures (size and refractive index) of a resin optical waveguide 10 and a silicon optical waveguide 20 were defined. The structures of the resin optical waveguide 10 and the silicon optical waveguide 20 in the simulation are shown below.

<Resin Optical Waveguide 10>
(Core 11)
  Width Wa: 3 μm, 4 μm, 5 μm, 6 μm, 7 μm
  Width Wb: 4 μm, 5 μm, 6 μm, 7 μm, 8 μm, 9 μm
  Core height: 2.345 μm
  Refractive index: 1.53
  Length L1: 1,500 μm
  Length L2: 400 μm
  Length L3: 150 μm
(Cladding 12)
  Thickness of undercladding 14: 15 μm
  Thickness of overcladding 13: 15 μm
  Refractive index: 1.516
<Silicon optical Waveguide 20>
(Core 21)
  Width: in an adiabatic-coupling portion 50, it is linearly changed from 0.4 μm to 0.12 μm (linearly decreased) from the end part at the side opposite to the optical waveguide part 16 of the coupling part 15 toward the end part at the side of the optical waveguide part 16
  Height: 0.19 μm
  Refractive index: 3.45
  Length of adiabatic-coupling portion 50: 1,750 μm (Cladding 22)
  Thickness: 15 μm
  Refractive index: 1.45
  Length of region 60 where only cladding 22 exists: 250 μm
<Adhesive 40>
  Resin thickness (distance between faces at which the core 11 of the resin optical waveguide 10 and the core 21 of the silicon optical waveguide 20 face each other): 1.0 μm, 1.5 μm
  Refractive index: 1.508
  Length of region 70 between silicon optical waveguide 20 and optical waveguide part 16 of resin optical waveguide 10: 50 μm
<Barrier Layer 80>
  Thickness: 0.03 μm
  Refractive index: 1.989

Hereinafter, there will be descried simulation results when light is propagated from the silicon optical waveguide 20 to the resin optical waveguide 10, with reference to FIG. 11 to FIG. 14.

Figure 11:
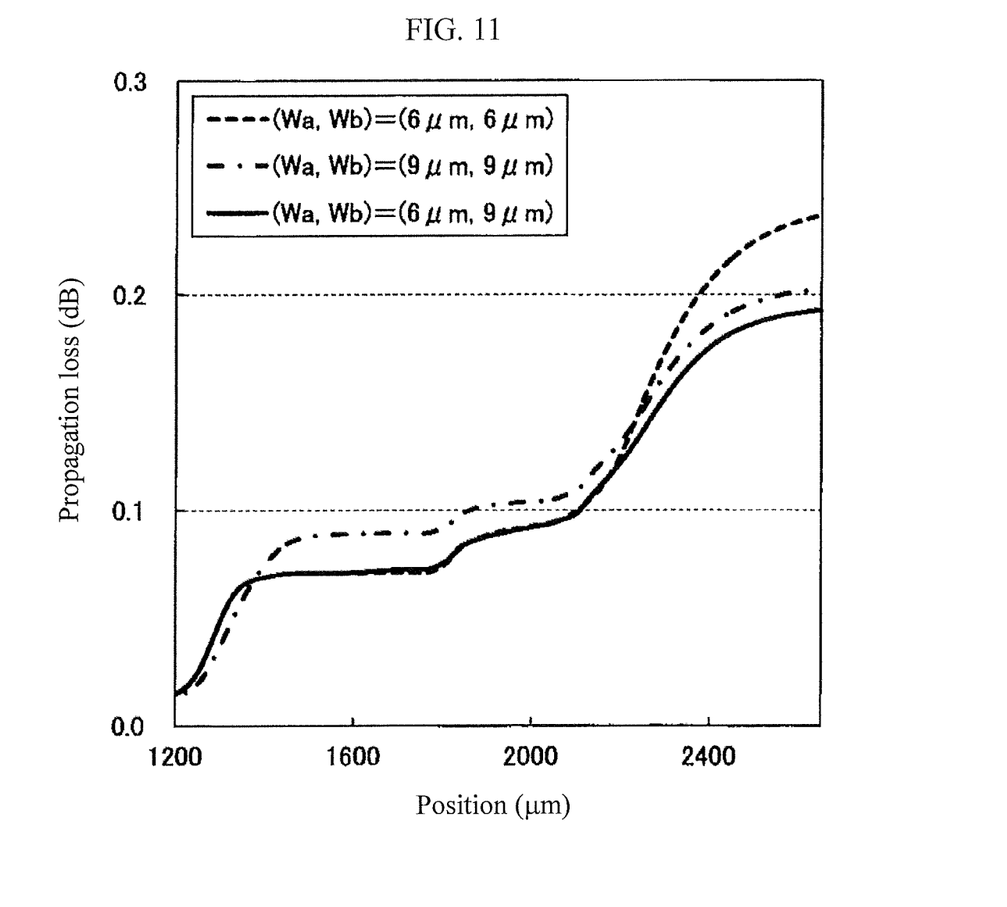
FIG. 11 is a figure for showing a relation between width of the core of a resin optical waveguide and propagation loss.

FIG. 11 is a figure for showing a relation between the width of the core of the resin optical waveguide and propagation loss and shows propagation loss when the width of the core is changed. In FIG. 11, the abscissa represents a position (μm) in the light propagation direction and the position at the end part of the side opposite to the optical waveguide part 16 of the coupling part 15 of the core 11 is set 0 μm. In FIG. 11, the ordinate represents propagation loss (dB). Moreover, in FIG. 11, the propagation loss at (Wa, Wb)=(6 μm, 9 μm) is indicated by a solid line, the propagation loss at (Wa, Wb)=(6 μm, 6 μm) is indicated by a broken line, and the propagation loss at (Wa, Wb)=(9 μm, 9 μm) is indicated by an alternate long and short dash line.

As shown in FIG. 11, it can be recognized that the case of (Wa, Wb)=(6 μm, 9 μm) shows lower propagation loss as compared with the case of (Wa, Wb)=(6 μm, 6 μm) and the case of (Wa, Wb)=(9 μm, 9 μm). Namely, the propagation loss can be reduced by forming the width Wb of the core 11 at the end part at the side of the optical waveguide part 16 of the coupling part 15 being larger than the width Wa of the core 11 at the end part at the side opposite to the optical waveguide part 16 of the coupling part 15.

Figure 12:
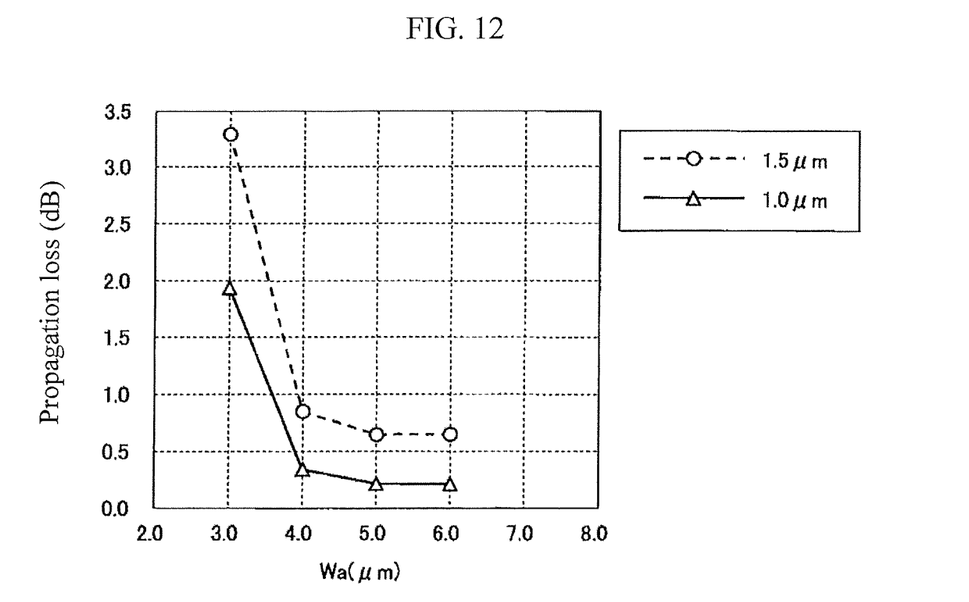
FIG. 12 is a figure for showing a relation between width of the core of a resin optical waveguide and propagation loss.

FIG. 12 is a figure for showing a relation between the width of the core of a resin optical waveguide and propagation loss and shows a relation between the width of the core Wa and the propagation loss (dB) in the case where the width of the core Wb of the resin optical waveguide is 7 μm. In FIG. 12, the propagation loss in the case where the thickness of the adhesive that bonds the resin optical waveguide and the silicon optical waveguide is 1.0 μm is indicated by a solid line and the propagation loss in the case where the thickness of the adhesive is 1.5 μm is indicated by a broken line.

As shown in FIG. 12, in the case where the width Wa of the core 11 is 3.0 μm, the propagation loss is high, regardless of the thickness of the adhesive 40. On the other hand, in the case where the width Wa of the core 11 is 4.0 μm or more, the propagation loss is low, regardless of the thickness of the adhesive 40.

Figure 13:
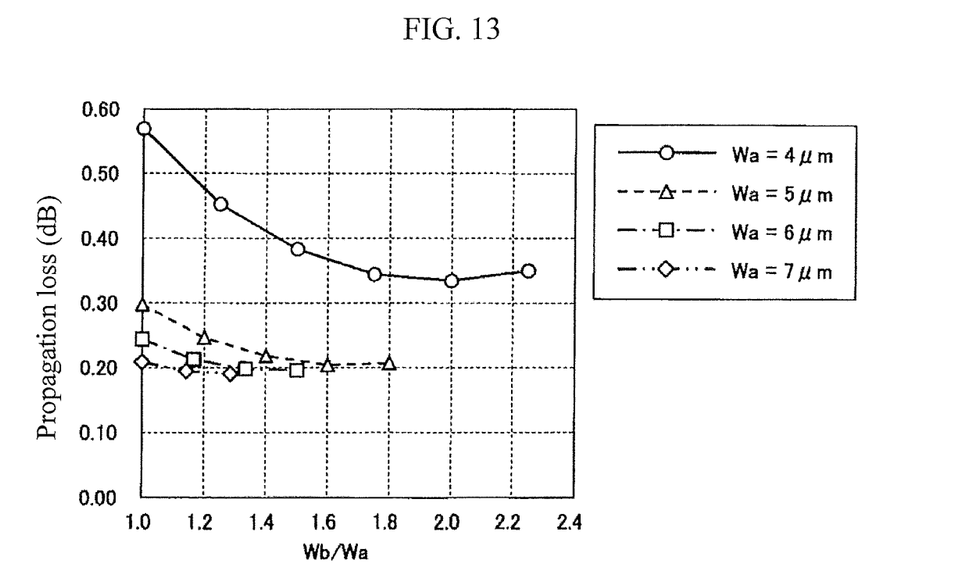
FIG. 13 is a figure for showing a relation between width of the core of a resin optical waveguide and propagation loss.

FIG. 13 is a figure for showing a relation between the width of the core of a resin optical waveguide and propagation loss and shows a relation between Wb/Wa and the propagation loss in the case where the thickness d of the adhesive that bonds the resin optical waveguide and the silicon optical waveguide is 1.0 μm. In FIG. 13, the abscissa represents Wb/Wa and the ordinate represents the propagation loss (dB). Moreover, in FIG. 13, the propagation loss in the case where Wa is 4 μm is indicated by a solid line, the propagation loss in the case where Wa is 5 μm is indicated by a broken line, the propagation loss in the case where Wa is 6 μm is indicated by an alternate long and short dash line, and the propagation loss in the case where Wa is 7 μm is indicated by an alternate long and two short dashes line.

As shown in FIG. 13, it can be recognized that the cases where the value calculated from Wb/Wa is larger than 1.0 show lower propagation loss as compared with the cases where Wb/Wa is 1.0, regardless of the value of Wa. Namely, the propagation loss can be reduced by forming the width Wb of the core 11 at the end part at the side of the optical waveguide part 16 of the coupling part 15 being larger than the width Wa of the core 11 at the end part at the side opposite to the optical waveguide part 16 of the coupling part 15. Particularly, the value calculated from Wb/Wa is preferably 1.1 or more, more preferably 1.2 or more, further preferably 1.3 or more, and preferably 1.4 or more. Thereby, propagation loss in the resin optical waveguide 10 can be particularly reduced.

Moreover, as shown in FIG. 13, it can be recognized that the propagation loss is particularly low as Wa increases from 4 μm, to 5 μm, 6 μm, and 7 μm. Namely, from the viewpoint that the propagation loss can be reduced, the width Wa at the end part at the side opposite to the optical waveguide part 16 of the coupling part 15 is preferably 4 μm or more, more preferably 5 μm or more, and further preferably 6 μm or more.

Incidentally, since it becomes difficult to actualize a stable single-mode propagation when Wb is larger than 10 μm, the width Wb at the end part at the side of the optical waveguide part 16 of the coupling part 15 is preferably 10 μm or less and more preferably 9 μm or less. Namely, for Wb/Wa, a preferable upper limit exists, 10/Wa is a preferable upper limit, and more preferred is 9/Wa.

Figure 14:
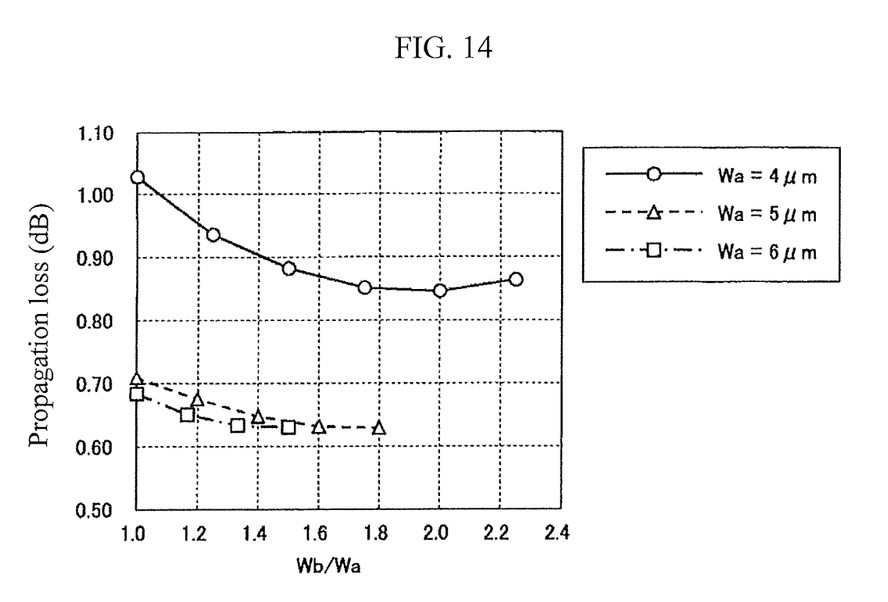
FIG. 14 is a figure for showing a relation between width of the core of a resin optical waveguide and propagation loss.

FIG. 14 is a figure for showing a relation between the width of the core of a resin optical waveguide and propagation loss and shows a relation between Wb/Wa and the propagation loss in the case where the thickness d of the adhesive that bonds the resin optical waveguide and the silicon optical waveguide is 1.5 μm. In FIG. 14, the abscissa represents Wb/Wa and the ordinate represents the propagation loss (dB). Moreover, in FIG. 14, the propagation loss in the case where Wa is 4 μm is indicated by a solid line, the propagation loss in the case where Wa is 5 μm is indicated by a broken line, and the propagation loss in the case where Wa is 6 μm is indicated by an alternate long and short dash line.

As shown in FIG. 14, it can be recognized that the same tendency is shown in the case where the thickness d of the adhesive 40 is 1.5 μm as in the case where the thickness d of the adhesive 40 is 1.0 μm (FIG. 13). Specifically, as shown in FIG. 14, it can be recognized that the cases where the value calculated from Wb/Wa is larger than 1.0 show lower propagation loss as compared with the cases where Wb/Wa is 1.0, regardless of the value of Wa. Namely, the propagation loss can be reduced by forming the width Wb of the core 11 at the end part at the side of the optical waveguide part 16 of the coupling part 15 being larger than the width Wa of the core 11 at the end part at the side opposite to the optical waveguide part 16 of the coupling part 15. Particularly, the value calculated from Wb/Wa is preferably 1.1 or more, more preferably 1.2 or more, further preferably 1.3 or more, and particularly preferably 1.4 or more. Thereby, the propagation loss in the resin optical waveguide 10 can be particularly reduced.

Moreover, as shown in FIG. 14, it can be recognized that the propagation loss is particularly low as Wa increases from 4 μm, to 5 μm and 6 μm. Namely, from the viewpoint that the propagation loss can be reduced, the width Wa at the end part at the side opposite to the optical waveguide part 16 of the coupling part 15 is preferably 4 μm or more, more preferably 5 μm or more, and further preferably 6 μm or more.

In the above, the modes for carrying out the present invention have been described but the above contents do not limit the contents of the invention and various modifications and improvements are possible within the scope of the present invention.

Incidentally, the above embodiments have been described with reference to the cases where the shape of the each face of the core 11 and core 21, perpendicular to the light propagation direction, is rectangular, as an example, but it is not limited thereto and may be, for example, trapezoidal, circular, or elliptical. Moreover, in the case where the shape of the each face of the core 11 and core 21, perpendicular to the light propagation direction, is polygonal such as rectangular or trapezoidal, the corners thereof may be rounded. In the case where the shape of the each face of the core 11 and core 21, perpendicular to the light propagation direction, is trapezoidal, circular or elliptical, the width of the core 11 and core 21 is measured at a half of the height of the core 11 and core 21 in the adiabatic-coupling portion 50.

Moreover, in the above embodiment, among the overcladding 13 and the undercladding 14 formed around the core 11, the cladding 12 that is not formed at the coupling part 15 is designated as the overcladding 13 but is not limited thereto. For example, the cladding 12 that is not formed at the coupling part 15 may be designated as the undercladding 14.

Furthermore, the above embodiments have been described with reference to the cases where light is propagated from the silicon optical waveguide 20 to the resin optical waveguide 10, as an example, but is not limited thereto. For example, the advantage of the present invention can be exhibited also with a similar configuration in the case where light is propagated from the resin optical waveguide 10 to the silicon optical waveguide 20.

While the present invention has been described in detail and with reference to specific embodiments thereof, it will be apparent to one skilled in the art that various changes and modifications can be made therein without departing from the spirit and scope thereof. The present application is based on Japanese Patent Application (No. 2016-173839) filed on Sep. 6, 2016, and the contents are incorporated herein by reference.

DESCRIPTION OF REFERENCE NUMERALS AND SIGNS

1: Composite optical waveguide
10: Resin optical waveguide
11: Core
111: First Core
112: Second core
113: Third core
12: Cladding
13: Overcladding
14: Undercladding
15: Coupling part
16: Optical waveguide part
20: Silicon optical waveguide
21: Core
22: Cladding
30: Connector

The invention claimed is:

1. A resin optical waveguide, comprising a core and a cladding having a refractive index lower than that of the core,
wherein:
the resin optical waveguide comprises, along a light propagation direction, a coupling part at which at least a part of the core is exposed, and an optical waveguide part where the whole circumference of the core is covered with the cladding;
the core has a width Wb at an end part of the coupling part at a side of the optical waveguide part being larger than a width Wa of the core at an end part of the coupling part at a side opposite to the optical waveguide part;
the core is composed of a first core part, a third core part and a second core part in this order along the light propagation direction in the coupling part;
the first core part includes the end part of the coupling part at the side opposite to the optical waveguide part, and the first core part has the width Wa which is constant along the entire length of the first core part;
the second core part includes the end part of the coupling part at the side of the optical waveguide part, and the second core part has the width Wb at least at a boundary portion between the second core part and the third core part;
the third core part is positioned between the first core part and the second core part, and has a width changing from the width Wb to the width Wa;
the first core part has a first length L1;
the second core part has a second length L2;
the third core part has a third length L3; and
the following relationship is satisfied:
L3/(L1+L2+L3) is 0.01 or more.

2. The resin optical waveguide according to claim 1, wherein the width Wa of the core is 4 µm or more.

3. The resin optical waveguide according to claim 1, wherein the width Wa of the core and the width Wb of the core satisfy the relation of (Wb/Wa)≥1.1.

4. The resin optical waveguide according to claim 1, wherein the width Wb of the core is 10 µm or less.

5. The resin optical waveguide according to claim 1, wherein the width of the third core part monotonously decreases from the boundary portion between the second core part and the third core part to a boundary portion between the first core part and the third core part.

6. A composite optical waveguide, comprising the resin optical waveguide described in claim 1 and a connector housing the optical waveguide part of the resin optical waveguide.

7. A resin optical waveguide, comprising a core and a cladding having a refractive index lower than that of the core,
wherein:
the resin optical waveguide comprises, along a light propagation direction, a coupling part at which at least a part of the core is exposed, and an optical waveguide part where the whole circumference of the core is covered with the cladding;
the core has a width Wb at an end part of the coupling part at a side of the optical waveguide part being larger than a width Wa of the core at an end part of the coupling part at a side opposite to the optical waveguide part;
the core is composed of a first core part, a third core part and a second core part in this order along the light propagation direction in the coupling part;
the first core part includes the end part of the coupling part at the side opposite to the optical waveguide part, and the first core part has the width Wa which is constant along the entire length of the first core part;
the second core part includes the end part of the coupling part at the side of the optical waveguide part, and the second core part has the width Wb at least at a boundary portion between the second core part and the third core part; and
the third core part is positioned between the first core part and the second core part, and has a width changing from the width Wb to the width Wa,
wherein at least one of a corner part of a boundary portion between the first core part and the third core part, and a corner part of the boundary portion between the second core part and the third core part, is chamfered.

8. The resin optical waveguide according to claim 7, wherein:
the first core part has a first length L1;
the second core part has a second length L2;
the third core part has a third length L3; and
the following relationship is satisfied:
L3/(L1+L2+L3) is 0.01 or more.

9. The resin optical waveguide according to claim 7, wherein the width Wa of the core is 4 µm or more.

10. The resin optical waveguide according to claim 7, wherein the width Wa of the core and the width Wb of the core satisfy the relation of (Wb/Wa)≥1.1.

11. The resin optical waveguide according to claim 7, wherein the width Wb of the core is 10 µm or less.

12. The resin optical waveguide according to claim 7, wherein the width of the third core part monotonously decreases from the boundary portion between the second core part and the third core part to a boundary portion between the first core part and the third core part.

13. A composite optical waveguide, comprising the resin optical waveguide described in claim 7 and a connector housing the optical waveguide part of the resin optical waveguide.

\* \* \* \* \*